United States Patent [19]

Hasenauer

[11] 4,443,523

[45] Apr. 17, 1984

[54] HIGH-TEMPERATURE BATTERY

[75] Inventor: Dieter Hasenauer, Weinheim, Fed. Rep. of Germany

[73] Assignee: Brown, Boveri & Cie AG, Mannheim, Fed. Rep. of Germany

[21] Appl. No.: 375,969

[22] Filed: May 7, 1982

[30] Foreign Application Priority Data

May 12, 1981 [DE] Fed. Rep. of Germany ....... 3118693

[51] Int. Cl.³ .............................................. H01M 2/10
[52] U.S. Cl. ..................................... 429/99; 429/102; 429/120
[58] Field of Search ...................... 429/99, 100, 95–98, 429/120, 102, 112

[56] References Cited

U.S. PATENT DOCUMENTS

| | | | |
|---|---|---|---|
| 3,837,918 | 9/1974 | Nakabayashi | 429/104 |
| 3,915,741 | 10/1975 | Kogiso et al. | 429/72 |
| 3,925,592 | 12/1975 | Webb | 429/99 X |
| 3,941,618 | 3/1976 | Mabuchi | 429/99 |
| 4,065,603 | 12/1977 | Coibion | 429/99 |
| 4,113,926 | 9/1978 | McBrien | 429/99 |
| 4,235,956 | 11/1980 | Gross et al. | 429/112 |
| 4,314,008 | 2/1982 | Blake | 429/8 |
| 4,332,866 | 6/1982 | Jacquelin | 429/112 X |

*Primary Examiner*—Charles F. LeFevour
*Attorney, Agent, or Firm*—Herbert L. Lerner; Laurence A. Greenberg

[57] ABSTRACT

High-temperature battery with at least one storage cell which is surrounded by thermal insulation and is fastened by means of a mounting in the interior of the thermal insulation. At least one detachable mounting is provided which has at least two clamping elements which are arranged one below the other at a defined distance for the self-supporting fastening of each storage cell. Each clamping element is connected to the adjoining clamping elements arranged in the same plane. The clamping elements of at least one plane are fastened to at least one support of the mounting.

5 Claims, 2 Drawing Figures

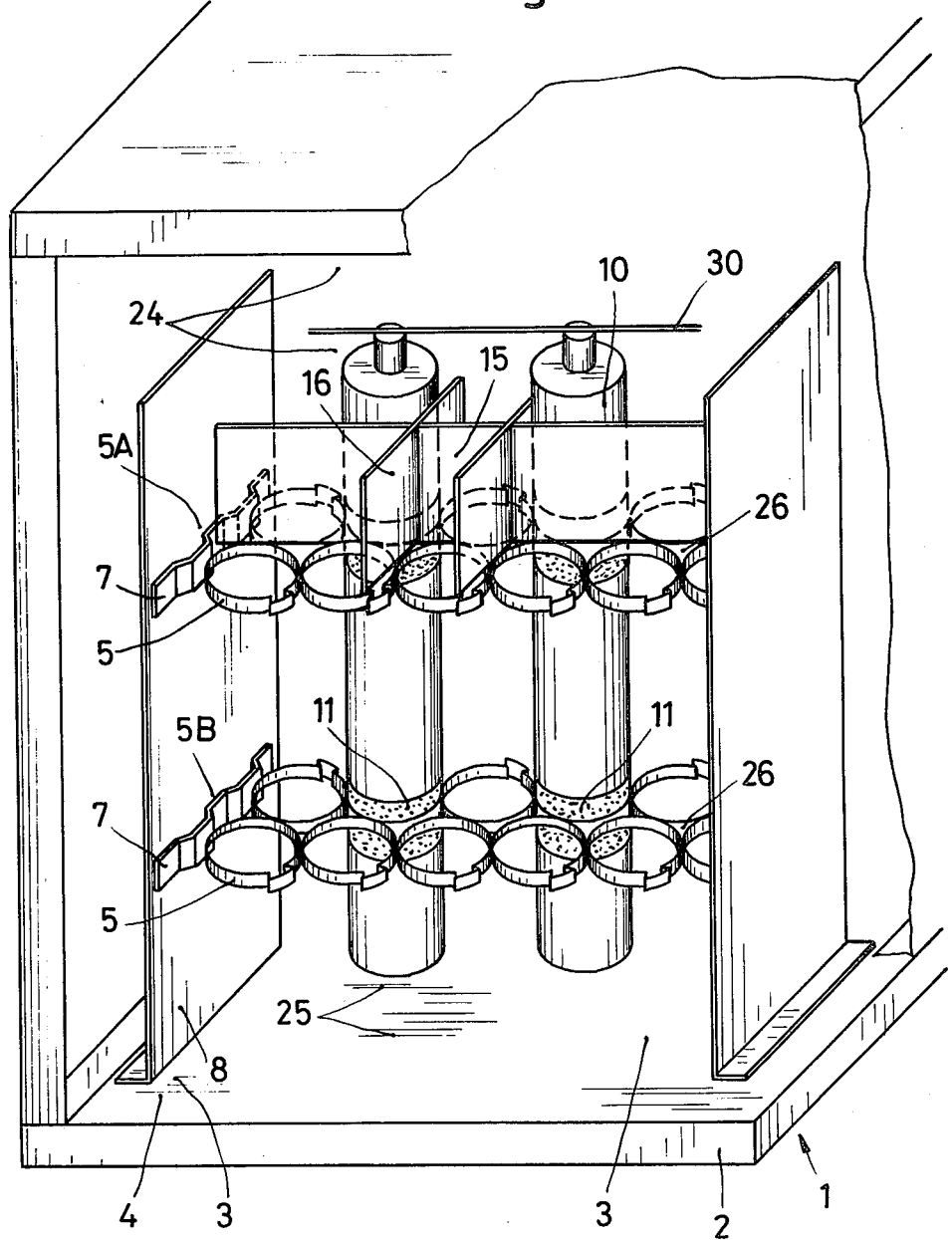

HIGH-TEMPERATURE BATTERY

BACKGROUND OF THE INVENTION

1. Field of the Invention

The invention relates to a high-temperature battery with at least one storage cell which is surrounded by thermal insulation and is fastened by means of a mounting in the interior of the thermal insulation.

2. Description of the Prior Art

Such high-temperature batteries which are constructed from electrochemical storage cells will be used increasingly in the future for the electric propulsion of vehicles.

The high-temperature batteries that have become known up to now are constructed from a multiplicity of electrochemical storage cells. For the electric propulsion of vehicles, high-temperature batteries with about 500 storage cells are required. The high-temperature batteries operate at a temperature of 350° C. to 500° C. In order to avoid heat losses, the storage cells of the high-temperature battery are surrounded by thermal insulation. On the other hand, however, adequate cooling within this high-temperature battery must also be provided, so that the operating temperature of the storage cells is not exceeded and damage thereto is prevented.

In the high-temperature batteries that have become known to date, a given number of storage cells is always combined and held together by one or several metal bands. The removal of an individual storage cell therefrom is possible only by loosening the entire assembly. A consequence of packing the storage cells closely together in this assembly, is that cooling of each individual cell is not possible or only incompletely so.

SUMMARY OF THE INVENTION

An object of the invention is to provide a high-temperature battery, in which the storage cells can be detached individually from the mounting and cooling air can flow around them on all sides.

With the foregoing and other objects in view, there is provided in accordance with the invention a high-temperature battery comprising a thermal insulation housing enclosing a mounting for clamping storage cells in the interior of the thermal insulation, said mounting having a plurality of clamping elements in an upper horizontal plane with each clamping element connected to the adjoining clamping element, a second plurality of clamping elements in a lower horizontal plane with each clamping element connected to the adjoining clamping elements, spaced below the clamping elements in the upper horizontal plane, said clamping elements in the upper and lower planes aligned to permit insertion of individual storage cells and clamping of each individual storage cell by an upper clamping element and an aligned lower clamping element, said mounting also having supports for the two planes of clamping elements, with the clamping elements of at least one plane fastened to at least one said support of the mounting. Other features which are considered as characteristic for the invention are set forth in the appended claims.

Although the invention is illustrated and described herein as embodied in a high-temperature battery, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 2 shows the high-temperature battery of FIG. 1 with storage cells inserted in the clamping rings of the mounting arranged in the interior of the thermal insulation housing.

DETAILED DESCRIPTION OF THE INVENTION

Figure 1:
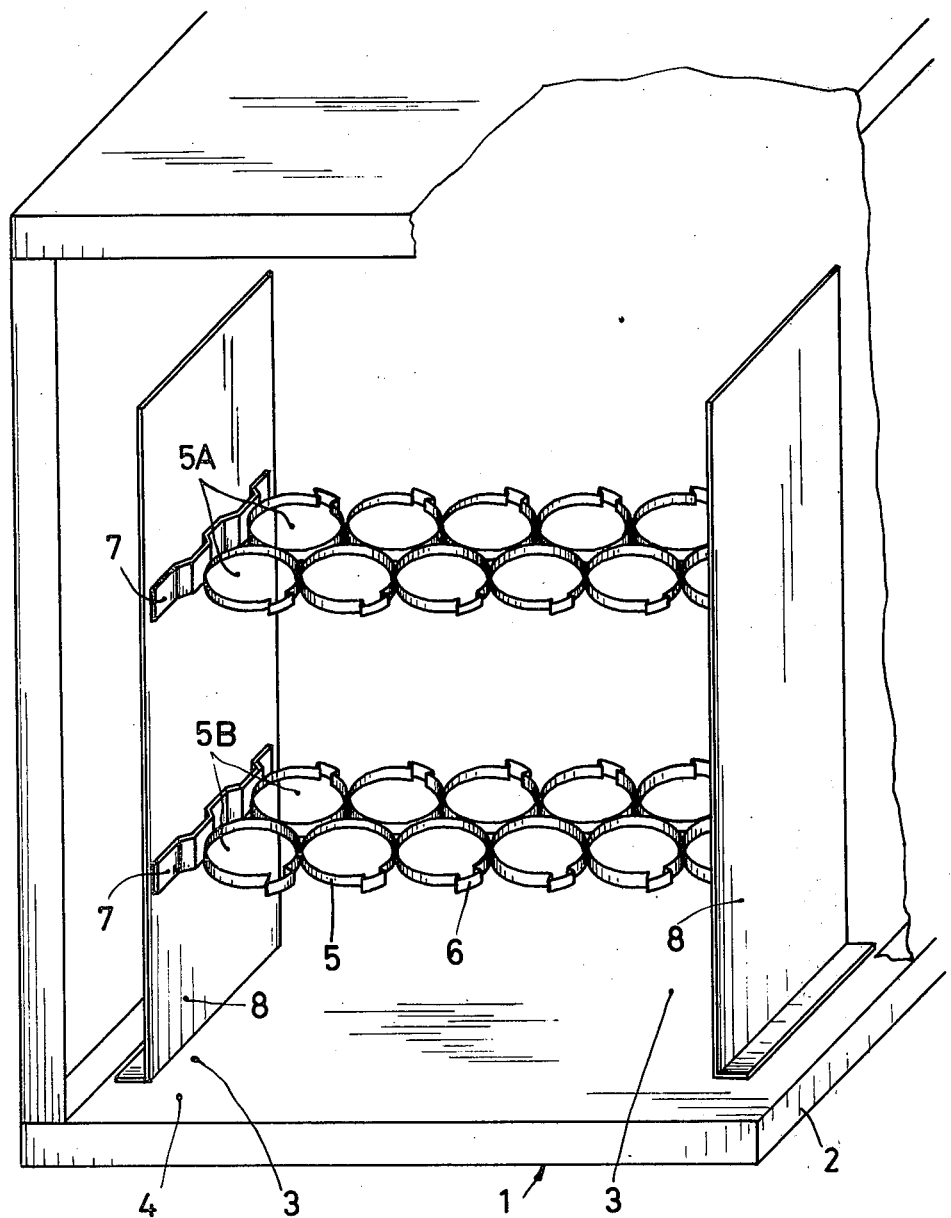
FIG. 1 diagrammatically illustrates an isometric view of the high-temperature battery in accordance with the invention, cut away to more clearly show the mounting without the cells of the battery. The mounting is made of two vertical supporting end plates. A horizontal set of attached clamping rings are supported by the end plates and beneath it a second aligned set of clamping rings are supported by the end plates. Each ring has an eye or lug for tightening or loosening the grip of the ring around the cell it encircles.

In a high-temperature battery of the type mentioned at the outset, at least one detachable mounting is provided which has, for the self-supporting fastening of each individual storage cell, at least two clamping elements which are arranged at a defined distance vertically one below the other. Each clamping element is connected to the adjoining clamping elements arranged in the same plane. The clamping elements of at least one plane are fastened to at least one support of the mounting.

The clamping elements of the mounting are preferably designed as clamping rings. Each clamping ring is provided with a clamping eye or lug. The clamping rings are preferably arranged so that their clamping eyes point outward and are readily accessible for assembling and disassembling the storage cells. The mounting provided in the interior of the thermal insulation for fastening the storage cells is preferably designed for fastening cylindrical storage cells. The mounting is furthermore designed so that the storage cells are arranged vertically within the high-temperature battery. For assembling and disassembling the storage cells, the diameters of the clamping rings are increased by opening the clamping eyes, so that the storage cells can be inserted between the clamping rings and removed from them in a simple manner. In the high-temperature battery according to the invention, each storage cell can be removed or reinserted individually. In one embodiment of the high-temperature battery, the mounting used has two clamping planes. Each plane is formed by two rows of clamping rings. The clamping rings of each plane are arranged in pairs and lined up.

In another embodiment of the invention, the clamping rings arranged in one plane are positioned so that the first row of clamping rings is offset relative to the second row of clamping rings. The clamping rings of the second plane are arranged accordingly. Each storage cell is covered with insulation in the region in which it is surrounded by the clamping element. The purpose of this insulation is to prevent an electrically conducting connection between the metal housing and the metal housing and the metallic clamping elements.

As already mentioned above, the two clamping ring rows are connected in each plane at both ends to a support. Preferably, two end plates are used for this purpose which are placed perpendicular to the two clamping ring planes. Each of the two rows of clamping rings in each plane are connected at both their ends in a force-locking manner to a sheet metal strap at each end. The metal straps are welded to the respective last two clamping rings of a plane. The metal straps can, preferably, be fastened to the end plates by a screw connection or a welded connection.

The two rows of clamping rings of each plane can be fastened directly to the two battery walls defining the clamping ring planes. This is done, preferably, again via sheet metal straps which are screwed to the battery wall, so that the two clamping ring planes can be opened at any time. Thereby, all the cells can be removed from the clamping. As additional protection, each storage cell is surrounded by partitions which form a kind of compartment. These partitions consist of an insulating material and are placed between the individual storage cells. Thereby, each storage cell is insulated from the adjacent storage cells. If one or several storage cells are destroyed, the adjoining storage cells are not affected by the outflowing reactants of the destroyed storage cells.

With the high-temperature battery according to the invention, repeated assembly or disassembly of each individual storage cell is possible without problem. By mounting each storage cell with at least two clamping elements, which are preferably designed as clamping rings with clamping eyes, enough space remains between the individual storage cells that cooling air can flow unimpeded along each storage cell. The mounting is, furthermore, designed so that an empty space remains between the upper and the lower end of the storage cells, along which the cooling air can likewise be conducted. Since the mounting consists only of the clamping rings and two end plates, this is a light-weight self-supporting design. The storage cells fastened with the clamping elements in accordance with the invention, ensure enough empty space for taking up the thermal expansion and thermal stresses of the storage cells at about 400° C.

The mounting is designed so that it provides, particularly above and between the planes of the clamping rings, adequate empty space between the storage cells for partitions about each storage cell forming a chamber-like safety compartment. Partitions are arranged between the storage cells, particularly above the first clamping ring plane and between the two clamping ring planes. Preferably, a partition is arranged so that it extends between the two clamping ring rows of each plane. Partitions extending perpendicularly thereto are then placed thereon. They are placed between two each pairs of clamping rings on the first-mentioned partition.

The invention will be explained in the following with particular reference to the drawings.

In FIG. 1 is shown the thermal insulation 2 and the mounting 3 of the high-temperature battery. The thermal insulation 2 is a double-walled housing. The space between the inner and outer boundary of the housing is evacuated and filled with insulating material (not shown here). In the interior of the housing there is a cavity or an empty space 4 which receives the storage cells (not shown here). The mounting 3, adapted particularly for cylindrical storage cells in the high-temperature battery of FIG. 1 is arranged within the thermal insulation 2.

The mounting 3 is detachably inserted into the empty space 4. If required, the mounting 3 can be removed therefrom. The number of mountings depends on the size of the battery, particularly on the number of storage cells. The mounting 3 is provided with clamping rings 5 for fastening the storage cells. The clamping rings 5 are installed in two planes 5A, 5B, with plane 5B disposed vertically below plane 5A. Two rows of clamping rings are provided in each plane 5A, 5B. The clamping rings 5 are arranged and aligned in pairs. Each clamping ring 5 is connected in locked manner to its adjoining clamping rings. The clamping rings 5 shown here are made of metal strip. The connection between the clamping rings is made, for instance, by spot welding. Each clamping ring 5 is additionally provided with a clamping eye 6, by means of which the inside diameter of each clamping ring 5 can be varied slightly. The clamping rings 5 are arranged so that their clamping eyes point outward. The two clamping rings 5 which are at the ends of the two clamping ring rows of each plane 5A, 5B, are additionally connected to a sheet metal strap 7. The two rows of clamping rings of each plane are arranged horizontally and screwed via the sheet metal strip 7 to two end plates 8 serving as supports. The end plates 8 extend perpendicularly to the clamping ring planes 5A and 5B.

The clamping eyes 6 of the clamping rings 5 are opened to permit insertion of the storage cells of the high-temperature battery 1 into the mounting 3. Thereby, the inside diameter of each clamping rings 5 is extended sufficiently to allow the storage cell to be inserted. Two each clamping rings 5, disposed vertically one below the other, are provided for mounting a storage cell. The distance between the upper and the lower clamping ring plane 5A, 5B is chosen so that the two clamping rings 5 provided for holding a storage cell surround the storage cell in the upper and lower region, respectively.

In FIG. 2, the high-temperature battery 1 shown in FIG. 1 is depicted once more, and specifically now with two of the storage cells 10 inserted in rings 5. As can be seen from FIG. 2, each storage cell, before it is pushed through the two clamping rings 5, is surrounded by insulating material 11. Preferably, only the two regions of the storage cell 10 which are surrounded by the clamping rings 5 are covered by the insulation material 11. The insulating material 11 prevents an electrically conducting connection between the metallic housing of the storage cell 10 and the clamping rings 5. After the storage cell 10 is pushed through the two clamping rings 5 which are arranged vertically one below the other, the clamping eyes 6 of these clamping rings are pushed together again. Thereby, the clamping rings 5 firmly grip the storage cell 10 with such a strong hold that the cell cannot slip through the clamping rings 5 even in the event of large shocks. The two clamping ring planes 5A and 5B are spaced to cause an empty space 24 and 25, respectively, to remain above the storage cells 10 as well as below the storage cells. As can be seen from FIGS. 1 and 2, there is a central empty space 26 between each four clamping rings 5 in a plane connected to each other and roughly forming a square. Since the clamping rings 5 in the plane below and in the plane above have the same arrangement, there will be empty spaces 26 in the two planes at the same points. The empty spaces 24, 25 and 26 formed in this manner make possible optimum cooling of each storage cell 10. Part of the cooling air which flows through the empty space 24 is discharged downward and conducted along the storage cells, through the empty spaces 26, into the empty space 25. Thereby, effective cooling of all external surfaces of each storage cell is obtained.

Each storage cell is surrounded in its upper and central area by partitions 15 and 16, which insulate it from the adjacent storage cells. In FIG. 2, the partitions 15 and 16 are shown only in the upper region of the storage cells 10. For this purpose, a partition 15 is arranged above each clamping ring plane. The latter is made of insulating material. This partition 15 is placed between the two storage cell rows. The partition 15 extends from the first end plate 8 to the second end plate 8. Partitions 16 are arranged to extend perpendicularly to partition 15, in order to delineate each storage cell 10 completely against the adjacent storage cells 10. Partitions 16 are, likewise, made of insulating material. A partition 16 is disposed between each two pairs of storage cells perpendicularly to the partition 15. In order to provide the necessary support, each partition 16 has in the center a slot which extends perpendicularly to its longitudinal axis (not shown here). The partitions 16 are placed on the partition 15 such that the latter engage in the slots of the partitions 16.

The clamping rings 5 of one plane are arranged and lined up in pairs in the mounting 3 shown in FIGS. 1 and 2. The clamping rings of one plane may also be arranged such that the clamping rings 5 of the second row are offset relative to the rings of the first row. Preferably, the clamping rings 5 of the second row are arranged in the gap between each two clamping rings 5 of the first row. Thereby, the storage cells 10 are closer to each other, and less space is required for mounting them. This greater utilization of space may permit more storage cells 10 within the battery. The empty spaces 26 remaining between the clamping rings 5 of a plane are still large enough to conduct a sufficient quantity of cooling air along the storage cells 10.

In the embodiment example shown here, six clamping rings 5 are associated with one row. Each of the two planes 5A and 5B has a total of 12 clamping rings 5. The number of clamping rings per plane is not limited to this number. Rather, it can be chosen larger or smaller. The same applies for the number of the rows of clamping rings of one plane. This number may be as large as desired. If the situation allows, the mounting 3 can be designed with the two end plates 8 extending slightly beyond the lower clamping ring plane 5B. In this embodiment, only the clamping rings 5 of this plane are fastened via the metallic sheet metal strap 7 to the end plates 8. The clamping rings 5 of the second plane are connected only to each other and to the storage cells 10.

I claim:

1. High-temperature battery comprising
   (a) a thermal insulation housing enclosing a mounting for clamping storage cells in the interior of the thermal insulation,
   (b) said mounting having a plurality of clamping elements in an upper horizontal plane with each clamping element connected to the adjoining clamping element,
   (c) a second plurality of clamping elements in a lower horizontal plane with each clamping element connected to the adjoining clamping element, spaced below the clamping elements in the upper horizontal plane,
   (d) each horizontal plane having at least two rows of clamping elements with each row of the same length and the rows arranged by the clamping elements of the same size lined up in pairs,
   (e) each pair of clamping elements in the lower plane arranged perpendicularly below one pair of clamping elements in the upper plane,
   (f) each clamping element in both planes formed as a clamping ring with at least one outward pointed clamping eye to permit insertion and removal of individual storage cells and a self-supported clamping of each individual storage cell by an upper clamping element and an aligned lower clamping element,
   (g) said mounting also having supports for the two planes of clamping elements with at least one support arranged at each lateral end of the mounting, and
   (h) wherein the last pair of clamping elements at the first and the second lateral end of each plane is connected with the said support.

2. High-temperature battery according to claim 1, wherein electrical insulation is interposed between each storage cell and each clamping element.

3. High-temperature battery according to claim 1, wherein said supports are an end plate at each end of the two clamping element rows of a plane.

4. High-temperature battery according to claim 1, wherein two mutually parallel boundary walls of the thermal insulation housing serve as supports of the mounting.

5. High-temperature battery according to claim 1, wherein each storage cell is insulated from the adjacent storage cell by partitions.

* * * * *